United States Patent

[11] 3,594,941

[72] Inventors Elliot Handler
Los Angeles;
Jack L. Barcus, Palos Verdes Peninsula;
Ralph H. Stewart, Los Angeles, all of, Calif.

[21] Appl. No. 779,873
[22] Filed Nov. 29, 1968
[45] Patented July 27, 1971
[73] Assignee Mattel, Inc.
Hawthorne, Calif.

[54] RECORD-PLAYING TELEPHONE TOY
1 Claim, 3 Drawing Figs.

[52] U.S. Cl. .......... 46/33, 46/175
[51] Int. Cl. .......... A63h 33/30
[50] Field of Search .......... 46/33, 117, 175

[56] References Cited
UNITED STATES PATENTS

| | | | |
|---|---|---|---|
| 1,704,880 | 3/1929 | Conklin | 46/33 |
| 2,110,380 | 3/1938 | Lohr | 46/33 |
| 2,633,769 | 4/1953 | Saks | 46/33 X |
| 3,315,406 | 4/1967 | Ryan | 46/117 X |

OTHER REFERENCES
Playthings magazine, page 61, April, 1958

*Primary Examiner*—F. Barry Shay
*Assistant Examiner*—Robert F. Cutting
*Attorney*—Seymour A. Scholnick

ABSTRACT: A toy telephone with a spring-powered phonograph in the telephone base that is operated by a drawstring. The drawstring is attached to the telephone handset, in the manner of a telephone cord, so that the phonograph is operated by pulling the handset away from the base and then releasing it. The drawstring is long enough to allow a child to hold the handset to his ear even when the drawstring is fully rewound into the telephone base.

INVENTORS
ELLIOT HANDLER
JACK L. BARCUS
RALPH H. STEWART

BY Max E. Shirk
ATTORNEY

RECORD-PLAYING TELEPHONE TOY

BACKGROUND OF THE INVENTION

1. Field of the Invention

This invention relates to toy phonographs and to a novel toy phonograph in the form of a telephone.

2. Description of the Prior Art

Toy telephones are particularly well suited as "talking" toys since telephones are apparatus, familiar to children, that produce conversation sounds. An easily operated phonograph mechanism useful in a toy telephone to produce short sayings utilizes a spring motor that is wound by pulling on a pull ring at the end of a drawstring, and is started by releasing the string. However, if the child must hold down the telephone base with one hand while pulling on a pull ring, it is difficult to also hold the handset.

OBJECTS AND SUMMARY OF THE INVENTION

An object of the present invention is to provide a record-playing toy telephone which is easily operated by a child.

Another object is to provide a toy telephone which is economical, of attractive appearance, and operable in a novel and interesting manner.

In accordance with the present invention, a toy telephone is provided which can be operated in a novel manner to produce sayings. The telephone includes a telephone base housing with a spring-powered phonograph that is wound by a drawstring. The drawstring is attached to a telephone handset in the manner of a telephone cord, so that the phonograph is operated by pulling the handset away from the base and then releasing it. Thus, a child can hold down the base with one hand and can hold the handset in the other hand, which is a normal position of telephone usage, instead of using one hand to hold a separate pull ring. The drawstring may be made long enough so that the child can hold the handset to his ear during the complete playing cycle, even when the drawstring is fully rewound into the base.

The novel features of the invention are set forth with particularity in the appended claims. The invention will be best understood from the following description when read in conjunction with the accompanying drawings.

DESCRIPTION OF THE PREFERRED EMBODIMENTS

Figures 1, 2, 3:
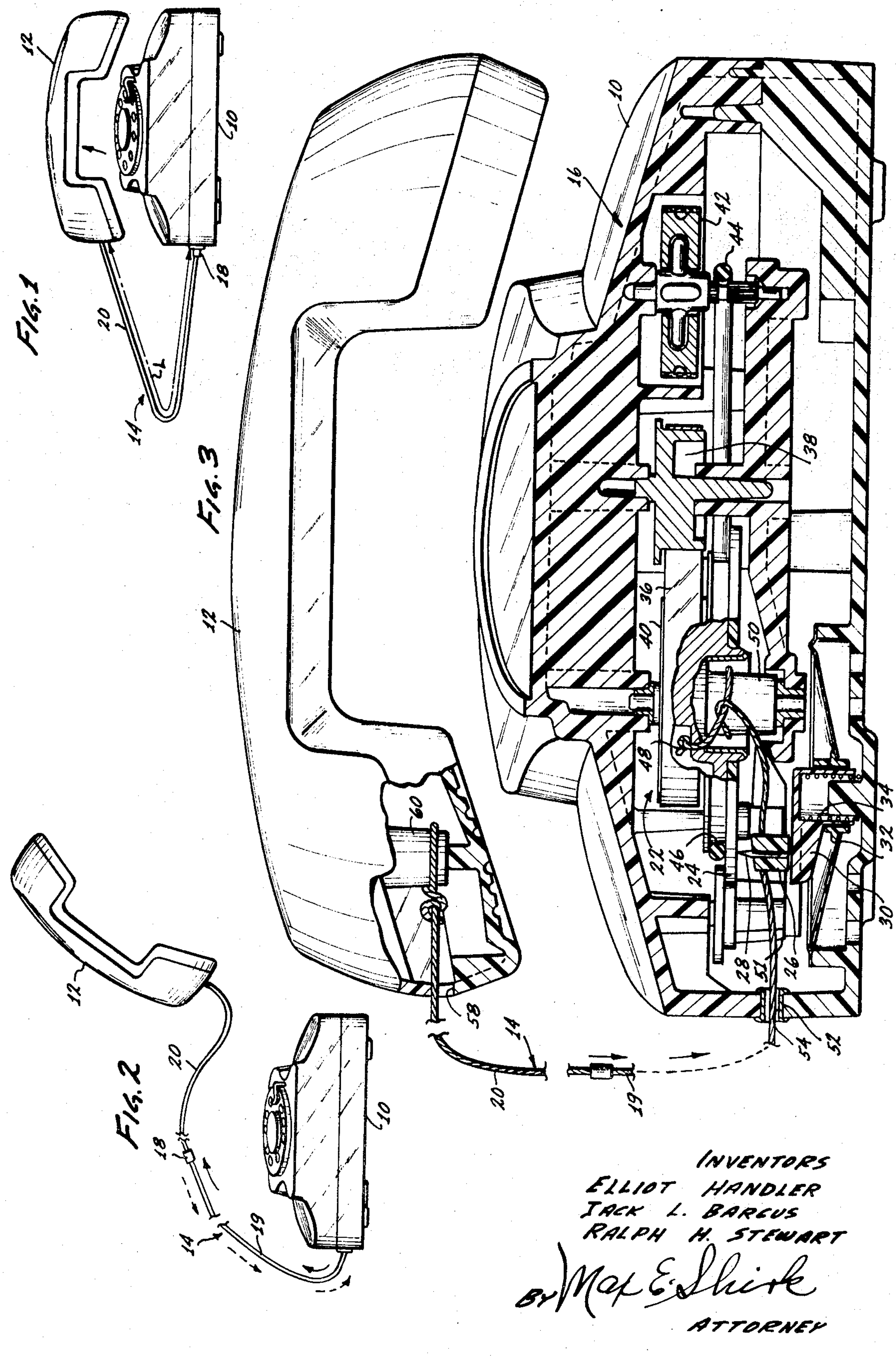
FIG. 1 is a front elevation view of a toy telephone constructed in accordance with the invention, shown prior to winding.
FIG. 2 is a view similar to the view of FIG. 1, but wherein the handset is in a partially pulled configuration.
FIG. 3 is a front view, partly in section, of the toy telephone of FIG. 1.

As shown in the figures, the toy includes a telephone base housing 10, a receiver or telephone handset housing 12, and a drawstring 14 simulating a telephone cord that extends from the base to the handset. A phonograph mechanism 16 mounted within the base housing can play sound recordings. The phonograph has a spring motor that is wound by pulling the drawstring, the motor being released to play a recording by releasing the drawstring after it has been pulled. To use the toy, a child lifts the handset housing 12 as shown in FIG. 1, pulls it a large distance away from the base housing, and then moves it close to the base housing as shown in FIG. 2 to allow the drawstring to rewind into the base housing. As the drawstring slowly rewinds into the base housing, the phonograph plays a recording, which is generally a conversationlike saying.

In order to assure positive or "snappy" rewind of the drawstring, a stop 18 is provided on the drawstring that limits drawstring movement into the base housing. The apparatus is constructed so that the spring motor is still slightly wound when the stop abuts the base housing, so that the spring is still pulling the drawstring when the stop 18 prevents further inward movement. The length of the inner end portion 18 of the drawstring, which can be rewound up to the stop, is longer than that required to play any of the recorded sayings, but shorter than that required for a complete unwinding of the spring motor.

The child can hold a handset housing 12 to his ear during the playing of the recording, to simulate adult use of real telephones. To enable comfortable holding to the ear, the drawstring includes a portion 20 between the stop 18 and handset housing 12 that is of a substantial length L. The length L is sufficient to permit a child to hold the handset to his ear while the base housing rests on his lap, even when the drawstring is fully rewound into the base up to the stop 18. A length L of at least 1 foot is generally sufficient for this purpose.

As shown in FIG. 3, the phonograph 16 includes a turntable 22 with a record 24 thereon that has several parallel spiral grooves, each of which defines a recording of several words of conversation, which may be referred to as a saying. A tone arm 26 is provided with a stylus 28 that engages a record groove. The armature 30 of a speaker cone assembly 32 is biased against the stylus by a spring 34 to acoustically amplify the sounds picked up by the stylus and thereby produce sounds which are easily heard.

The turntable is rotated by a spring motor which includes a negator spring 36 that can be wound off a drum 38 that is rotatably mounted on the base housing, and around a skirt 40 on the turntable. The spring then tends to rewind itself back onto the drum 38, by rotating the turntable 22 in a direction that causes playing of the record. A governor 42 which is rotatably mounted on the base housing, and is coupled by a belt 44 to a groove 46 on the turntable, regulates the speed at which the turntable rotates during playing.

The spring motor is wound by the drawstring 14 which has an inner end 48 that is tied to the turntable. The inner end portion of the drawstrings has several turns about a barrel portion 50 of the turntable when the spring is unwound. When the drawstring is pulled, it turns the barrel portion of the turntable, causing the spring 36 to wind onto the skirt 40 thereof, and thereby wind up the spring motor. The drawstring also extends through a hole in the tone arm to lift the tone arm from the record and frictionally urge it toward the rim of the record, until the tone arm strikes a stop 51. When the drawstring is released, the stylus 28 falls into the beginning of a groove and the turntable turns, to begin the playing of a recording.

The base mounting has a grommet member 52 that forms the walls of an aperture 54 through which the drawstring moves. The stop 18 on the drawstring is larger than the aperture 52, so the drawstring stops abruptly when the stop reaches the grommet. This occurs when the spring 36 is still wound slightly around the turntable skirt, so the drawstring is still being pulled in. This prevents an untidy appearance wherein the stop 18 might be loosely dangling at a position an inch or so away from the grommet member 52.

The outer end 56 of the drawstring is attached to the handset housing by extending it through a hole 58 therein and tying it to a post 60 therein. Thus, the drawstring enters the handset in the same manner as telephone cords commonly enter real telephone handsets.

While the phonograph is generally placed in the base housing 10, it is also possible to place a small phonograph in the handset. Winding of the spring motor then can be accomplished in a similar manner, by pulling the handset away from the base. In such a case, a sound would appear to come from the handset, which is somewhat more realistic. However, the base housing is generally larger, so it is easier to install a phonograph in it.

Thus, the invention provides a toy telephone which can be easily operated to simulate a real telephone. This is accomplished by attaching the drawstring of a phonograph motor between the base and handset housings. In addition to the simplification of operation of the toy telephone, this construction eliminates a separate pull ring which would be unsightly and would make it difficult to hold the handset during the use of the toy. Accordingly, the present invention enhances realism in both operation and appearance.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. A toy telephone comprising:
a telephone base housing;
a telephone handset housing;
phonograph means mounted in one of said housings and comprising a rotary turntable, a spring motor for rotating said turntable, a drum connected to said spring motor and a drawstring wound on said drum for energizing said spring motor;
said drawstring extending outwardly of said one housing to the other housing whereby to energize said spring motor by pulling said housing apart; and
stop means fixed on said drawstring, intermediate the ends thereof and a substantial distance from said other housing for engaging said one housing to limit retraction of said drawstring within said one housing, leaving a substantial length of drawstring between said housings to simulate a telephone cord connecting said handset and base.